United States Patent
Zhou et al.

(10) Patent No.: US 11,379,221 B2
(45) Date of Patent: Jul. 5, 2022

(54) VERSION CONTROL MECHANISMS AUGMENTED WITH SEMANTIC ANALYSIS FOR DETERMINING CAUSE OF SOFTWARE DEFECTS

(71) Applicant: INTERNATIONAL BUSINESS MACHINES CORPORATION, Armonk, NY (US)

(72) Inventors: Xiao Yin Zhou, Beijing (CN); Zhenni Yan, Beijing (CN); Ya Ling Xu, Beijing (CN); Xin Peng Liu, Beijing (CN); Qian Xu, Beijing (CN); Chao Feng, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/792,081

(22) Filed: Feb. 14, 2020

(65) Prior Publication Data
US 2021/0255853 A1 Aug. 19, 2021

(51) Int. Cl.
*G06F 8/71* (2018.01)
*G06F 8/75* (2018.01)
*G06F 11/36* (2006.01)

(52) U.S. Cl.
CPC .............. *G06F 8/71* (2013.01); *G06F 8/75* (2013.01); *G06F 11/3624* (2013.01)

(58) Field of Classification Search
None
See application file for complete search history.

(56) References Cited

U.S. PATENT DOCUMENTS

| 8,495,100 B2 | 7/2013 | Cheung | |
|---|---|---|---|
| 8,984,485 B2 | 3/2015 | Elshishiny et al. | |
| 2004/0015843 A1* | 1/2004 | Quan, Jr. | G06F 8/427 717/110 |
| 2004/0103124 A1* | 5/2004 | Kupkova | G06F 16/93 |

(Continued)

FOREIGN PATENT DOCUMENTS

| CN | 102831057 B | 12/2012 |
|---|---|---|
| CN | 107203468 A | 9/2017 |

OTHER PUBLICATIONS

Kawrykow et al., "Non-Essential Changes in Version Histories," ACM, 2011, 10pg. (Year: 2011).*

(Continued)

*Primary Examiner* — Ryan D. Coyer
(74) *Attorney, Agent, or Firm* — Konrad Raynes Davda & Victor LLP; Rabindranath Dutta

(57) ABSTRACT

A plurality of metadata corresponding to a plurality of code versions of an application stored in a version control system is generated. A determination is made of a set of changes between a first metadata of a first code version and a second metadata of a second code version. A classification is made of elements in the set of changes into a first category and a second category based on a set of predetermined rules, wherein the elements classified into the first category are better candidates to determine causes of defects in the application than the elements classified into the second category. The elements classified in the first category are used to determine a cause of a defect in the application.

15 Claims, 12 Drawing Sheets

(56) References Cited

U.S. PATENT DOCUMENTS

| | | | |
|---|---|---|---|
| 2005/0114840 A1* | 5/2005 | Zeidman | G06F 8/71 |
| | | | 717/126 |
| 2006/0168565 A1* | 7/2006 | Gamma | G06F 11/3688 |
| | | | 717/122 |
| 2010/0050154 A1* | 2/2010 | Balasubramanian | G06F 8/33 |
| | | | 717/113 |
| 2013/0152046 A1* | 6/2013 | Salecker | G06F 8/71 |
| | | | 717/122 |
| 2014/0331203 A1 | 11/2014 | Elshishiny et al. | |
| 2015/0100940 A1* | 4/2015 | Mockus | G06F 8/70 |
| | | | 717/101 |
| 2020/0117446 A1* | 4/2020 | Smith | G06N 3/0445 |

OTHER PUBLICATIONS

Van Den Berg, J., et al., "Matching Source Code Using Abstract Syntax Trees in Version Control Systems", Journal of Software Engineering and Applications, Published Jun. 29, 2018, 23 pp.

\* cited by examiner

FIG. 6A

Changes in AST

▼ TypeDeclaration [2166+10620]
  ▶ > type binding: com.ibm.biospace.av.resource.AnalysisResource
  ▶ JAVADOC
  ▶ MODIFIERS (2)
    INTERFACE: 'false'
  ▶ NAME
    TYPE_PARAMETERS (0)
    SUPERCLASS_TYPE: null
    SUPER_INTERFACE_TYPES (0)
  ▼ BODY_DECLARATIONS (16)
    ▶ FieldDeclaration [2462+213]
    ▶ FieldDeclaration [2680+82]
    ▶ FieldDeclaration [2765+53]
    ▶ FieldDeclaration [2823+42]
    ▶ FieldDeclaration [2870+53]
    ▼ MethodDeclaration [2928+1271]              CB-P3-M4
      ▶ > method binding: AnalysisResource.newAnalysis(Analysis)
      JAVADOC: null
      ▶ MODIFIERS (4)
      CONSTRUCTOR: 'false'
      TYPE_PARAMETERS (0)
      ▶ RETURN_TYPE2
      ▶ NAME
      RECEIVER_TYPE: null
      RECEIVER_QUALIFIER: null
      ▶ PARAMETERS (1)
      EXTRA_DIMENSIONS2 (0)
      ▶ THROWN_EXCEPTION_TYPES (2)
      ▼ BODY
        ▼ Block [3107+1092]
          ▼ STATEMENTS (10)
            ▶ VariableDeclarationStatement [3112+44]
            ▶ IfStatement [3160+187]
            ▶ ExpressionStatement [3352+79]
            ▶ ExpressionStatement [3435+54]
            ▶ ExpressionStatement [3493+54]
            ▶ IfStatement [3551+159]
            ▶ VariableDeclarationStatement [3714+78]
            ▶ ExpressionStatement [3796+91]
            ▶ ExpressionStatement [3891+134]
            ▶ ReturnStatement [4029+166]
  ▶ MethodDeclaration [4204+365]

▼ TypeDeclaration [2166+11170]
  ▸ > type binding: com.ibm.biospace.av.resource.AnalysisResource
  ▸ JAVADOC
  ▸ MODIFIERS (2)
    INTERFACE: 'false'
  ▸ NAME
    TYPE_PARAMETERS (0)
    SUPERCLASS_TYPE: null
    SUPER_INTERFACE_TYPES (0)
▼ BODY_DECLARATIONS (16)
  ▸ FieldDeclaration [2462+213]
  ▸ FieldDeclaration [2680+82]
  ▸ FieldDeclaration [2765+53]
  ▸ FieldDeclaration [2823+42]
  ▸ FieldDeclaration [2870+53]
▼ MethodDeclaration [2928+1281]
  ▸ > method binding: AnalysisResource.newAnalysis(Analysis)
    JAVADOC: null
    ▸ MODIFIERS (4)              CB-P3-M4'
    CONSTRUCTOR: 'false'
    TYPE_PARAMETERS (0)
    ▸ RETURN_TYPE2
    ▸ NAME
    RECEIVER_TYPE: null
    RECEIVER_QUALIFIER: null
    ▸ PARAMETERS (1)
    EXTRA_DIMENSIONS2 (0)
    ▸ THROWN_EXCEPTION_TYPES (2)
    ▼ BODY
      ▼ Block [3107+1642]
        ▼ STATEMENTS (14)
          ▸ VariableDeclarationStatement [3112+44]
          ▸ IfStatement [3160+356]
          ▸ ExpressionStatement [3520+79]
          ▸ ExpressionStatement [3603+54]
          ▸ ExpressionStatement [3661+54]
          ▸ IfStatement [3719+159]
          ▸ ExpressionStatement [3882+79]
          ▸ ExpressionStatement [3965+54]
          ▸ ExpressionStatement [4023+54]
          ▸ VariableDeclarationStatement [4801+78]
          ▸ ExpressionStatement [4163+91]
          ▸ ExpressionStatement [4258+134]
          ▸ IfStatement [4396+179]
          ▸ ReturnStatement [4579+166]
  ▸ MethodDeclaration [4754+365]

VERSION CONTROL MECHANISMS AUGMENTED WITH SEMANTIC ANALYSIS FOR DETERMINING CAUSE OF SOFTWARE DEFECTS

BACKGROUND

1. Field

Embodiments relate to version control mechanisms augmented with semantic analysis for determining cause of software defects.

2. Background

Many software development projects may be a collaborative effort of a plurality of software developers. Each software developer may be responsible for writing a different module of the source code for the software development project. Files for a module may be iteratively changed as the software development project progresses. Additionally, once a version of the software has been released, a new version with additional features may be developed.

Since files of source code are iteratively modified in the course of such software development projects, version control systems are used to record changes to files by keeping track of modifications done to the source code. Changes to a file or set of files are recorded over time in a version control system so that a software developer can recall an earlier version of files later on, even though the current codebase is based on a later version of files. The files may of course comprise source code for an application that undergoes revisions over time. Such recall of files or sets of files may be needed for various purposes, including detection of software defects during the course of software development.

Syntax and semantics are terms that relate to a programming language. The syntax in a programming language involves the set of permitted phrases of the programming language whereas semantics expresses the associated meaning of those phrases.

An abstract syntax tree (AST) is a tree representation of the abstract syntactic structure of source code written in a programming language. Each node of the tree denotes a construct occurring in the source code. The syntax is "abstract" in the sense that it does not represent every detail appearing in the real syntax, but rather just the structural or content-related details. Semantic analysis is a process in compiler construction or in other domains of computing that gathers necessary semantic information from the source code written in a programming language.

SUMMARY OF THE PREFERRED EMBODIMENTS

Provided are a method, a system, and a computer program product in which a plurality of metadata corresponding to a plurality of code versions of an application stored in a version control system is generated. A determination is made of a set of changes between a first metadata of a first code version and a second metadata of a second code version. A classification is made of elements in the set of changes into a first category and a second category based on a set of predetermined rules, wherein the elements classified into the first category are better candidates to determine causes of defects in the application than the elements classified into the second category. The elements classified in the first category are used to determine a cause of a defect in the application.

In further embodiments, the metadata comprises an abstract syntax tree (AST) that represents a syntactic structure of a source code, wherein each node of the AST denotes a content or structure related construct occurring in the source code.

In certain embodiments, a change in code logic is classified into the first category.

In further embodiments, a change in comment is classified into the second category.

In additional embodiments, calling dependency trees are generated by extracting ASTs in the plurality of code versions.

In further embodiments, consideration of changes classified in the second category are avoided while determining the cause of the defect in the application.

In certain embodiments, pruning is performed of potential candidates for analyzing the defects by using only changes classified in the first category to analyze the defects.

BRIEF DESCRIPTION OF THE DRAWINGS

Referring now to the drawings in which like reference numbers represent corresponding parts throughout:

FIG. 6A and FIG. 6B show a block diagram that shows exemplary changes in AST between two code versions, in accordance with certain embodiments;

DETAILED DESCRIPTION

In the following description, reference is made to the accompanying drawings which form a part hereof and which illustrate several embodiments. It is understood that other embodiments may be utilized and structural and operational changes may be made.

Software support service may address specific problem for a product or service. Such problems may be raised by customers and classified into different levels of severities. A high severity problem may need to be resolved in a relatively short amount of time. During this process, a relatively time consuming task is the root cause analysis task that locates the offending code that causes the high severity problem. The root cause analysis task attempts to determine the primary causes of a defect in the code that causes problems.

The following operations may comprise a work flow to perform the root cause analysis task:
(1) Reproduce the defects;
(2) Analyze log files to find errors and exceptions;
(3) Identify several candidate offending components that may be the cause of the defects;
(4) Analyze the calling stack of the components;
(5) Locate the problematic methods;
(6) Use source code control tool to check the version changes history of affected files in a version control system; and
(7) Use a difference generation program to compare various versions to find offending code changes that caused the defects.

Some of the above operations may be assisted by automatic systems, but it is still time consuming to locate the problematic components. There may be many source code files delivered in one change set in a version control system, and a software developer may have to search these files one by one to identify the offending code change.

Certain embodiments perform semantics analysis in version control systems to expedite the identification of offending code changes. For each code commit, a version control system may perform semantics analysis based on AST (Abstract Syntax Tree) and classifies the changes to ASTs over code versions based on the likelihood of the changes being responsible for causing the defect. All information is stored as metadata. When a software issue is raised by client, support specialists may use the semantics based change history to speed up resolution, e.g. locate the problematic source code, perform root cause analysis and provide a resolution to the problem.

Therefore, certain embodiments improve the operations of a computer system by analyzing defects in software expeditiously by determining changes in AST over code versions, and by filtering out unimportant changes between code versions to reduce the number of files to examine. Important changes between code versions are examined for root cause analysis.

EXEMPLARY EMBODIMENTS

Figure 1:
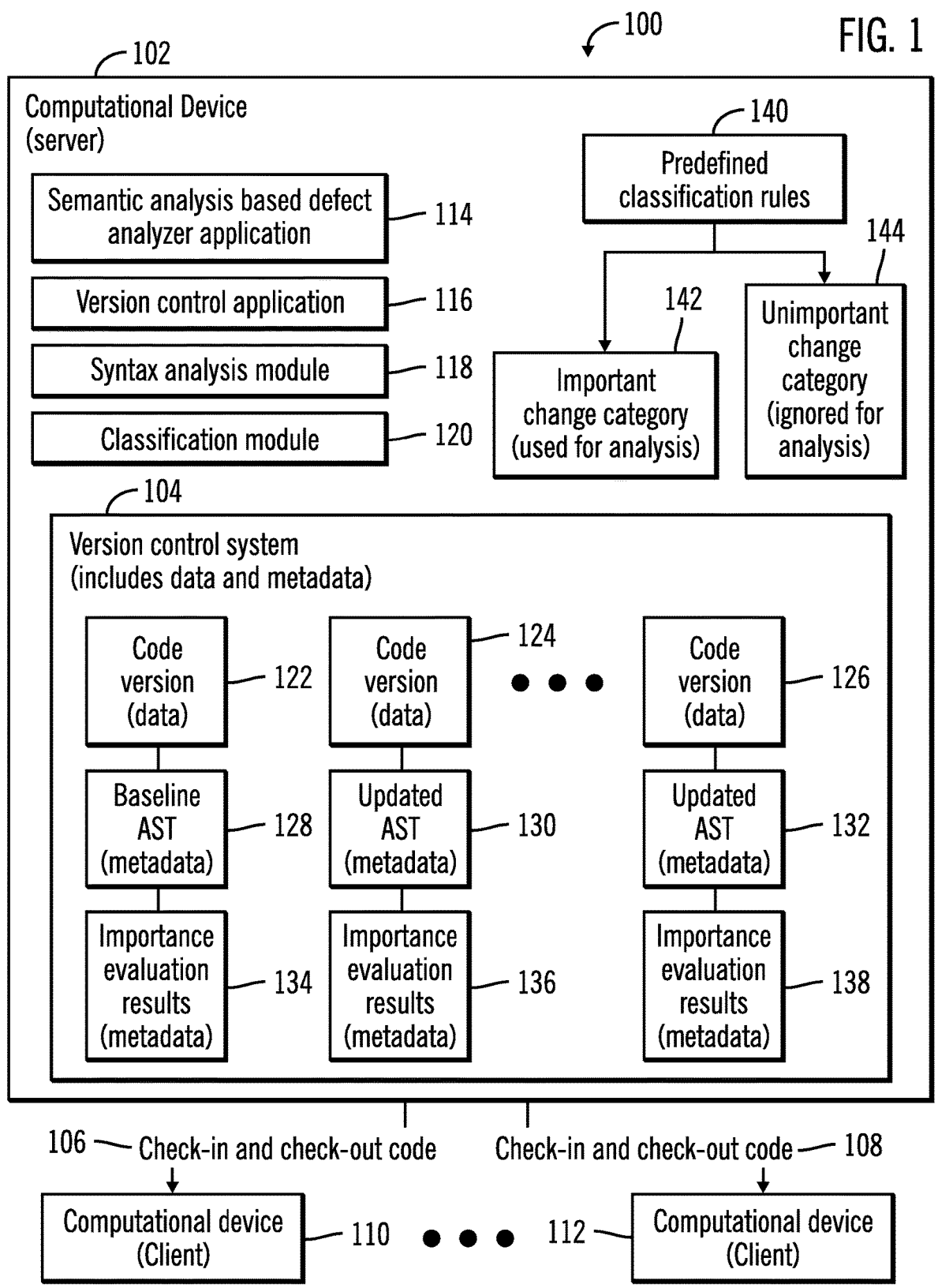
FIG. 1 illustrates a block diagram of a computing environment comprising a computational device that performs semantic based defect analysis by augmenting a version control system with metadata, in accordance with certain embodiments.

FIG. 1 illustrates a block diagram of a computing environment 100 comprising a computational device 102 that performs semantic based defect analysis by augmenting a version control system with metadata, in accordance with certain embodiments.

The computational device 102 may be any suitable computational device presently known in the art, such as a personal computer, a workstation, a server, a mainframe, a handheld computer, a telephony device, a network appliance, etc. The computational device 102 may be included in any suitable network, such as, a storage area network, a wide area network, the Internet, an intranet, etc. In certain embodiments, the computational device may be included in a cloud computing environment.

In certain embodiments, the computational device 102 is a server that includes a version control system 104 with respect to which software developers perform check-in and check-out of code (reference numerals 106, 108) via client computational devices 110, 112.

A semantic analysis based defect analyzer application 114, a version control application 116, a syntax analysis module 118 and a classification module 120 may execute in the computational device 102.

The version control application 116 maintains a plurality of code versions 122, 124, 126 in the version control system 104. The code versions 122, 124, 126 may be considered to be the data of the version control system and comprise source code, and other types of elements that are used in various versions of a software project.

The semantic analysis based defect analyzer application 114 augments the code versions 122, 124, 126 with metadata that comprise ASTs 128, 130, 132 of the code versions and importance evaluation results 134, 136, 138. The importance evaluation results 134, 136, 138 indicate whether a change in AST between versions is important enough to be used in root cause analysis of defects.

In certain embodiments, the syntax analysis module 118 which analyzes the syntax of source code generates ASTs corresponding to code versions, and the classification module 120 uses predetermined classification rules 140 to classify changes between ASTs into important change category 142 and unimportant change category 144. Changes placed in the important change category 142 are used for root cause analysis, whereas changes placed in the unimportant change category 144 are ignored for root cause analysis.

Figure 2:
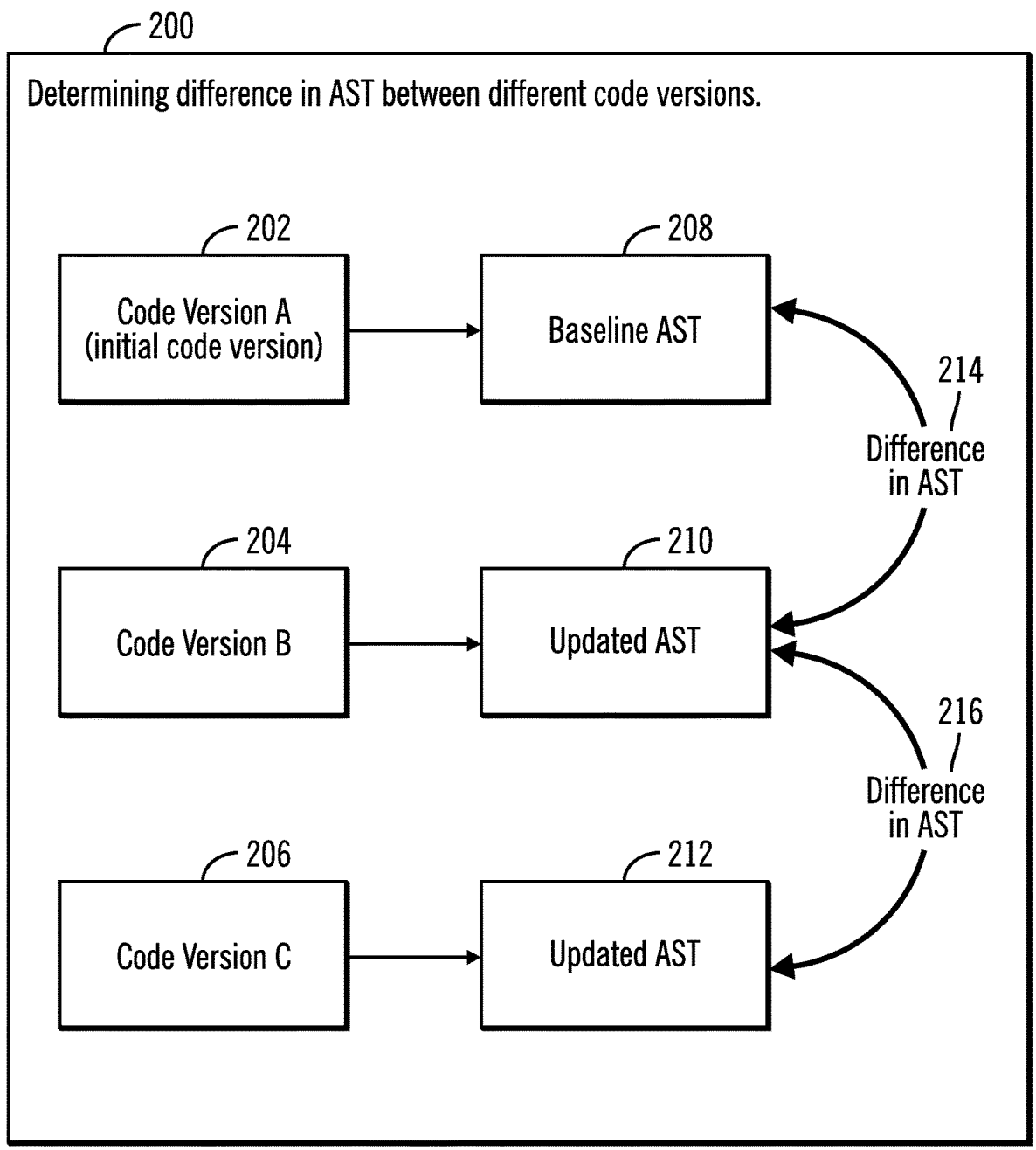
FIG. 2 illustrates a block diagram that shows determination of differences in AST between different code versions, in accordance with certain embodiments.

FIG. 2 illustrates a block diagram 200 that shows determination of differences in AST between different code versions, in accordance with certain embodiments. For example code version A 202 which is the initial code version may have a baseline AST 208, code version B 204 may have an updated AST 210, and code version C 206 may have an updated AST 212. The difference in AST between two consecutive versions is shown via reference numerals 214, 216.

Figure 3:
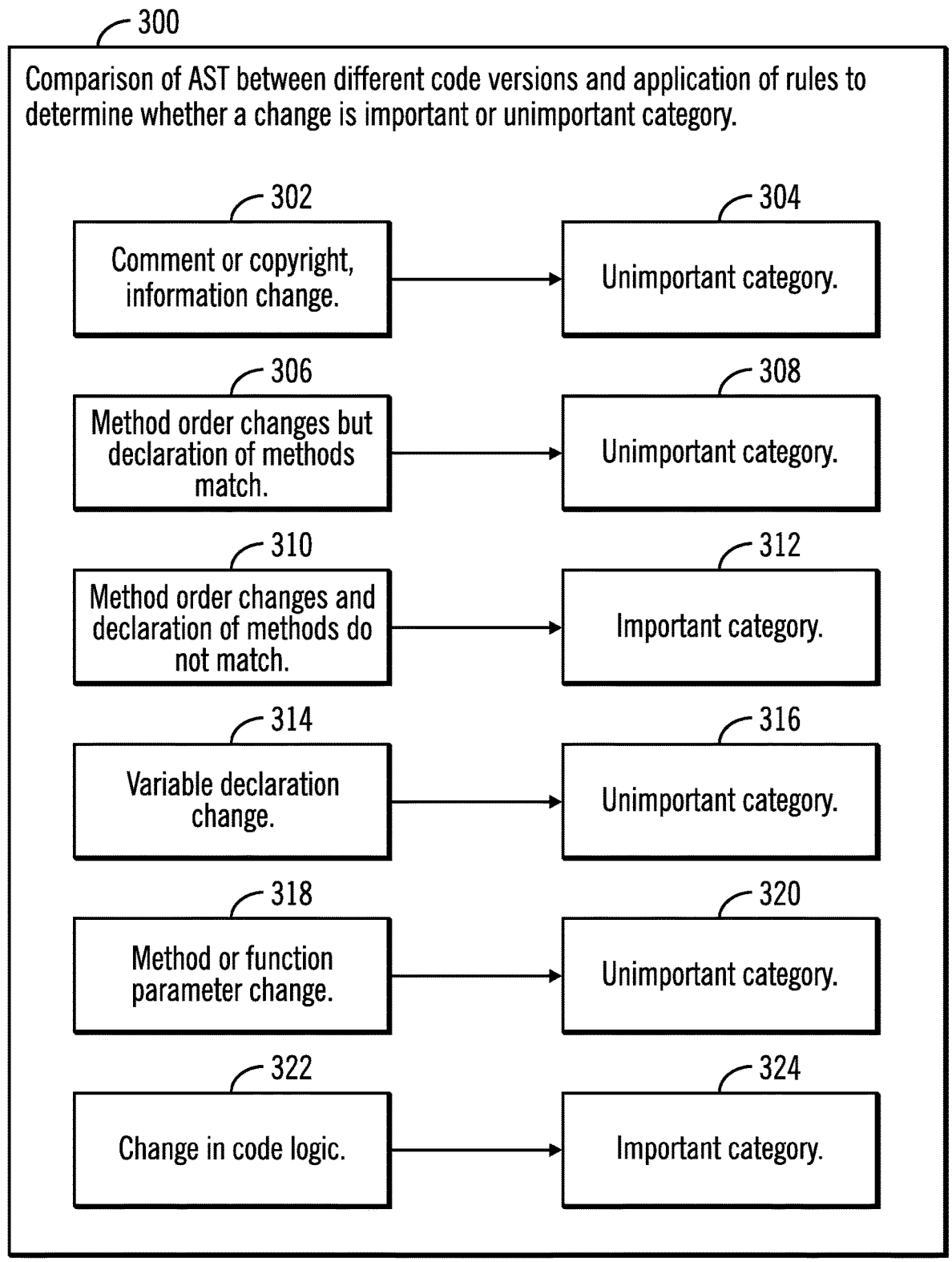
FIG. 3 illustrates a block diagram that shows a comparison of ASTs between different code versions and application of rules to determine whether a change is important or unimportant, in accordance with certain embodiments.

FIG. 3 illustrates a block diagram 300 that shows a comparison of ASTs between different code versions and application of rules to determine whether a change is important or unimportant for root cause analysis, in accordance with certain embodiments.

In certain embodiments, comments or copyright information changes 302 are classified into unimportant category 304 as they are not important for root cause analysis. If the method order changes but declaration of methods match on comparing ASTs (reference numeral 306) then this is classified into unimportant category 308. However, if the method order changes and the declaration of methods do not match (reference numeral 310) then this is classified into important category 312.

Variable declaration changes 314 and method or function parameter changes 318 are placed in unimportant category 316, 320. However, any change in code logic 322 is placed in important category 324 because of its importance in root cause analysis.

Figure 4:
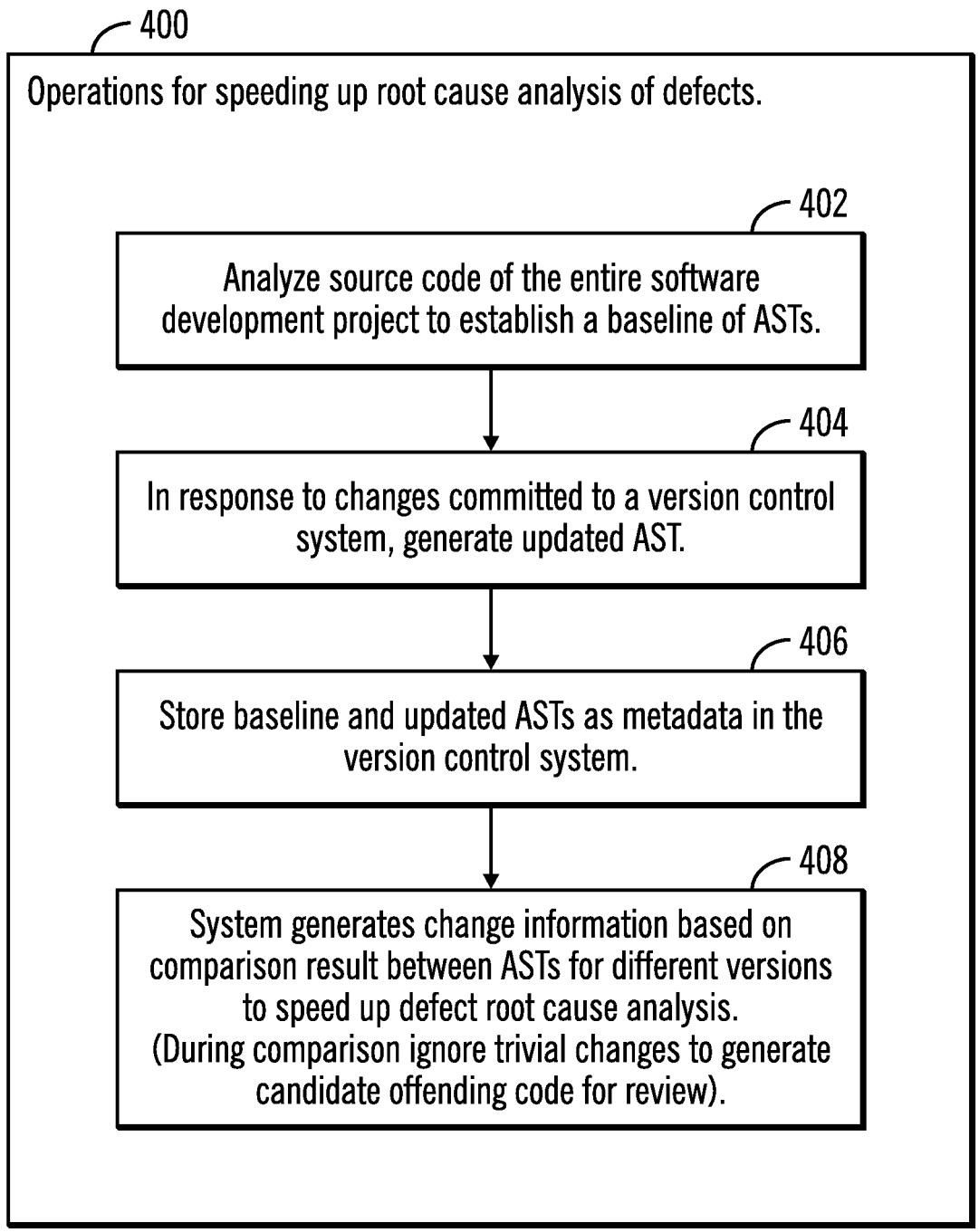
FIG. 4 illustrates a flowchart that shows operations for speeding up root cause analysis of defects, in accordance with certain embodiments.

FIG. 4 illustrates a flowchart that shows operations for speeding up root cause analysis of defects, in accordance with certain embodiments.

Control starts at block 402 in which an analysis is performed of source code of the entire software development project to establish a baseline of ASTs. Control proceeds to block 404 in which in response to changes committed to a version control system an updated AST is generated.

The baseline and updated ASTs are stored (at block 406) as metadata in the version control system 104. Control proceeds to block 408 in which the system generates change information based on comparison result between ASTs for different code versions to speed up defect root cause analysis. During comparison, trivial changes are ignored to generate candidate offending code for review for root cause analysis.

Figure 5:
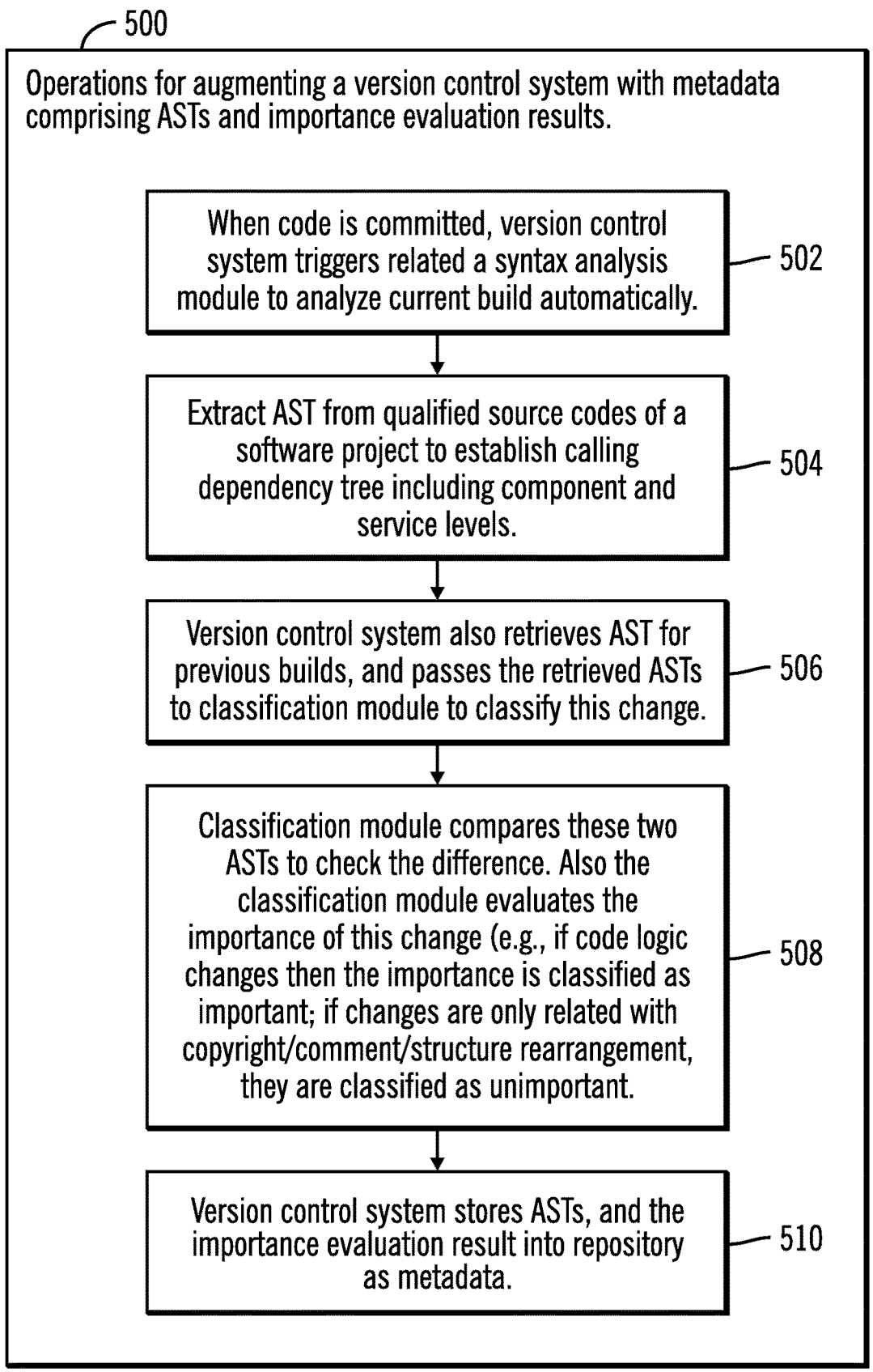
FIG. 5 illustrates a flowchart that shows operations for augmenting a version control system with metadata comprising ASTs and importance evaluation results, in accordance with certain embodiments.

FIG. 5 illustrates a flowchart 500 that shows operations for augmenting a version control system with metadata comprising ASTs and importance evaluation results, in accordance with certain embodiments.

Control starts at block 502 in which when code is committed, version control system triggers a syntax analysis module 118, to analyze a current build automatically. Control proceeds to block 504 in which the process extracts AST from qualified source codes of a project to establish a calling dependency tree including component and service levels.

The version control system also retrieve AST for previous builds, and passes the retrieved ASTs to the classification module to classify the change between builds (at block 506). The classification module compares these two ASTs to check the difference (at block 508). Also the classification module evaluates (at block 508) the importance of this change (e.g., if code logic changes, then the change is classified into important category. If changes are only related with copyright, comments, or structure rearrangement, then the changes are classified into an unimportant category.

In certain embodiments, version control system may store AST, and its importance evaluation result into repository as metadata. A process may compare two versions based on AST using pre-defined rules. Processes may also generate other reports based on real changes.

FIG. 6A and FIG. 6B show a block diagram 600 that shows exemplary changes in AST between two code versions, in accordance with certain embodiments.

On the left V1 602 is indicative of an AST of a first version of code, and on the right V2 604 is indicative of an AST of a second version of code. The changes between the ASTs of a section are shown via reference numerals 606, 608, 610, 612.

Figure 7:
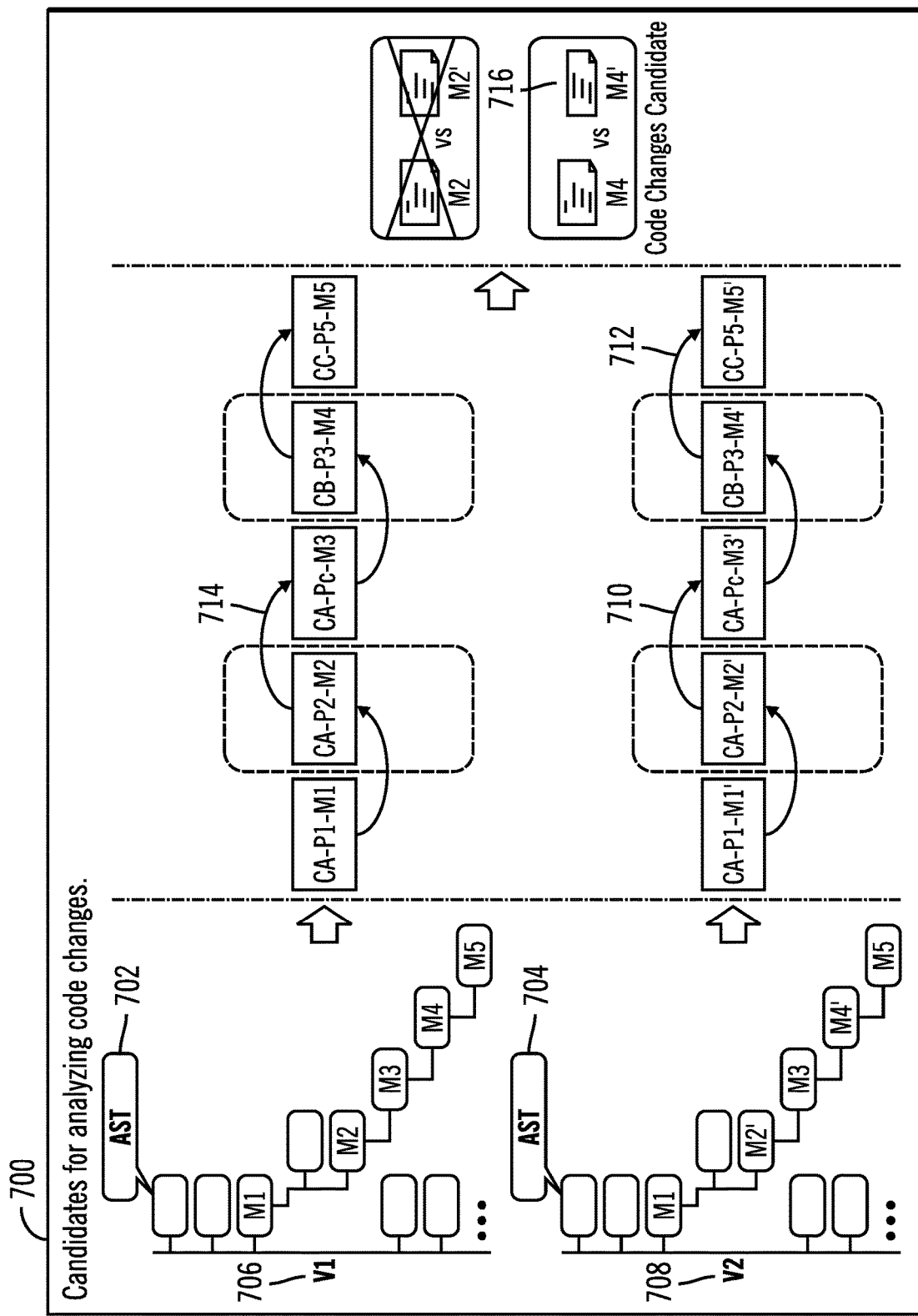
FIG. 7 shows a block diagram that shows candidates for analyzing code changes, in accordance with certain embodiments.

FIG. 7 shows a block diagram 700 that shows candidates for analyzing code changes, in accordance with certain embodiments. In response to an error that occurs, the ASTs 702 and 704 of two code versions 706 and 708 and build calling dependences (e.g., 710, 712, 714) are analyzed to determine that only certain code change candidates 716 are to be used for root cause analysis of the error.

Figure 8:
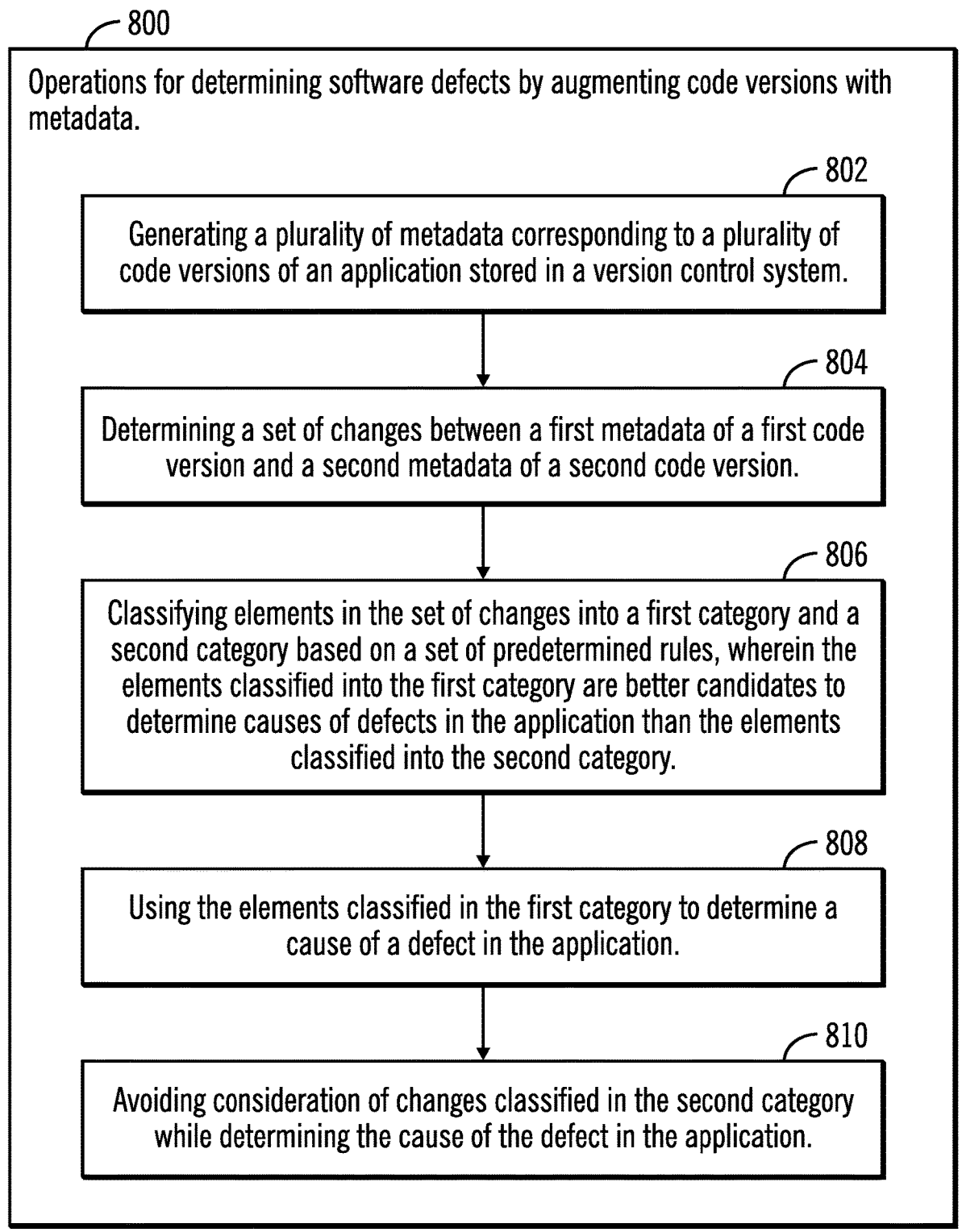
FIG. 8 illustrates a flowchart that shows operations for determining software defects by augmenting code versions with metadata, in accordance with certain embodiments.

FIG. 8 illustrates a flowchart 800 that shows operations for determining software defects by augmenting code versions with metadata, in accordance with certain embodiments. The operations shown in FIG. 8 may be performed by applications and modules 114, 116, 118, 120 that execute in the computational device 102.

Control starts at block 802 in which a plurality of metadata 128, 130, 132, 134, 136, 138 corresponding to a plurality of code versions 122, 124, 126 of an application stored in a version control system 104 is generated. A determination is made (at block 804) of a set of changes between a first metadata 128 of a first code version 122 and a second metadata 130 of a second code version 124. A classification is made (at block 806) of elements in the set of changes into a first category 142 and a second category 144 based on a set of predetermined rules 140, wherein the elements classified into the first category 142 are better candidates to determine causes of defects in the application than the elements classified into the second category 144.

From block 806 control proceeds to block 808 in which the elements classified in the first category 142 are used to determine a cause of a defect in the application. Consideration of changes classified in the second category 144 are avoided (at block 810) while determining the cause of the defect in the application.

In further embodiments, the metadata comprises an abstract syntax tree (AST) that represents a syntactic structure of a source code, wherein each node of the AST denotes a content or structure related construct occurring in the source code.

Therefore, FIGS. 1-8 illustrate certain embodiments in which pruning is performed of potential candidates for analyzing defects by using only changes in AST classified in the important category to analyze the root cause of defects. As a result of the pruning the process of performing root cause analysis is speeded up over mechanisms in which no pruning is performed.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 9:
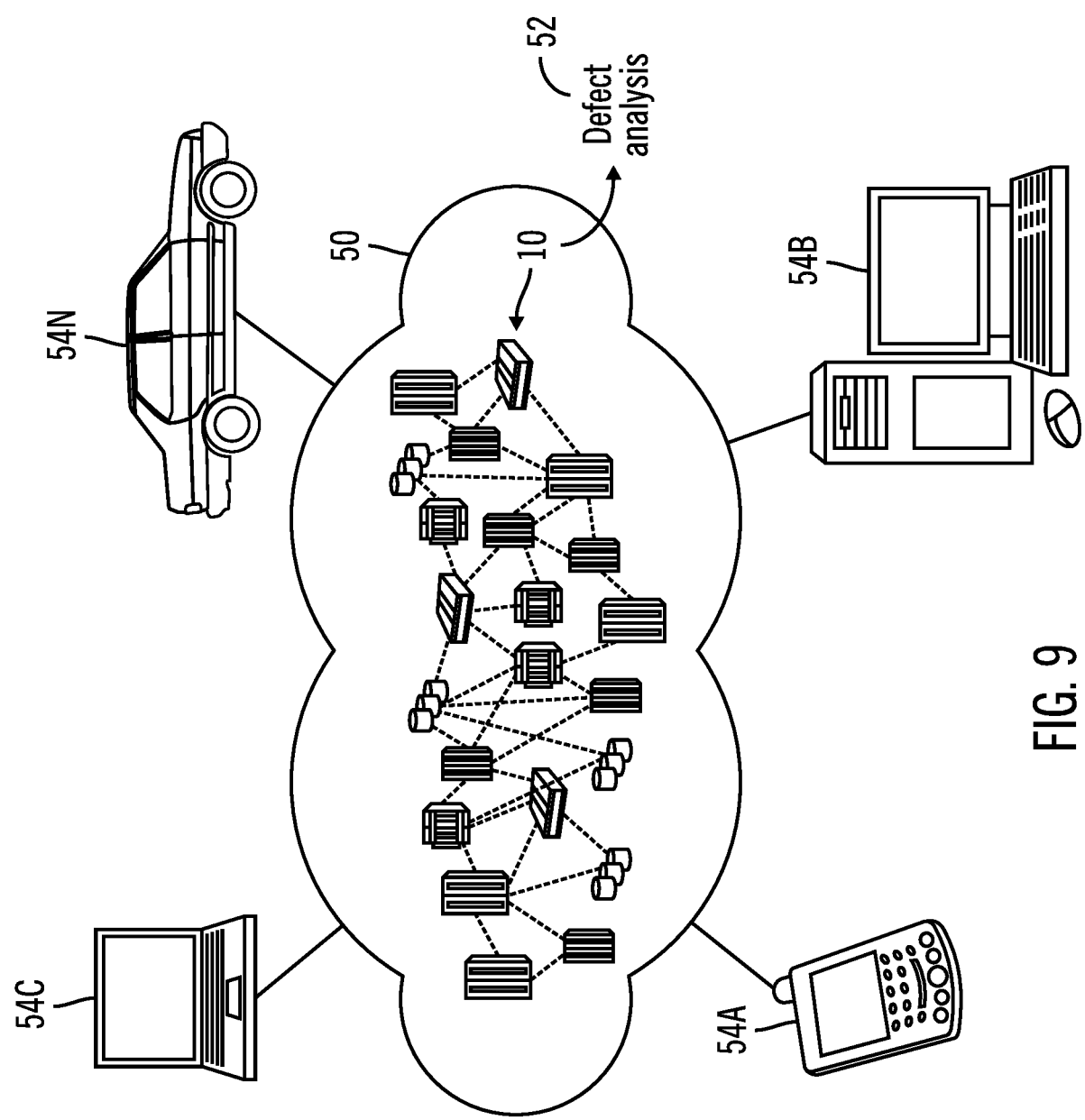
FIG. 9 illustrates a block diagram of a cloud computing environment, in accordance with certain embodiments.

Referring now to FIG. 9 an illustrative cloud computing environment 50 is depicted. Defect analysis (shown via reference numeral 52) is performed in the cloud computing environment 50. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
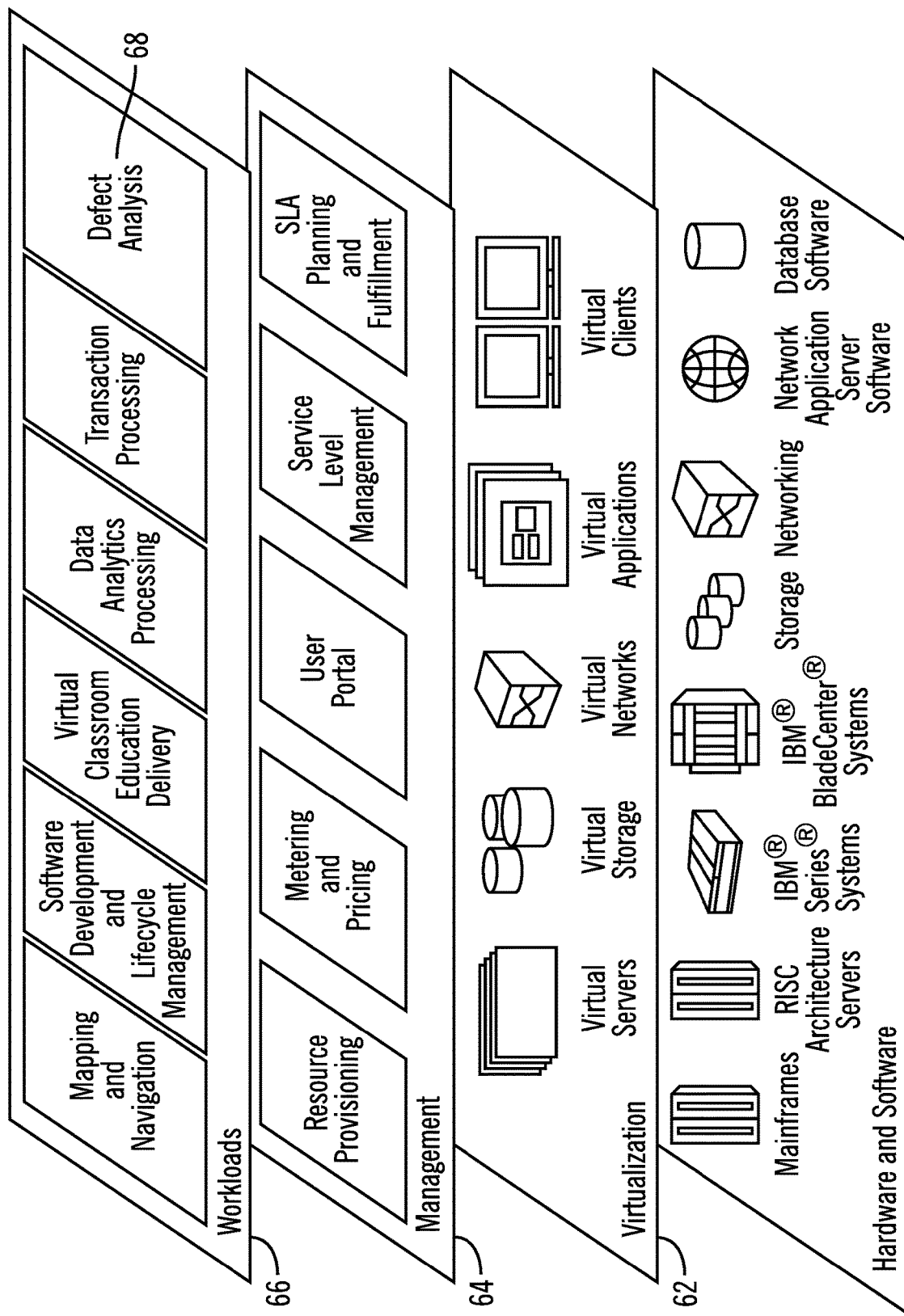
FIG. 10 illustrates a block diagram of further details of the cloud computing environment of FIG. 9, in accordance with certain embodiments.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto.

Hardware and software layer 60 includes hardware and software components. Examples of hardware components include mainframes, in one example IBM ZSERIES* systems; RISC (Reduced Instruction Set Computer) architecture based servers, in one example IBM PSERIES* systems; IBM XSERIES* systems; IBM BLADECENTER* systems; storage devices; networks and networking components. Examples of software components include network application server software, in one example IBM WEBSPRERE* application server software; and database software, in one example IBM DB2* database software.

* IBM, ZSERIES, PSERIES, XSERIES, BLADECENTER, WEBSPHERE, and DB2 are trademarks or registered trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and defect analysis 68 as shown in FIGS. 1-10.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 11:
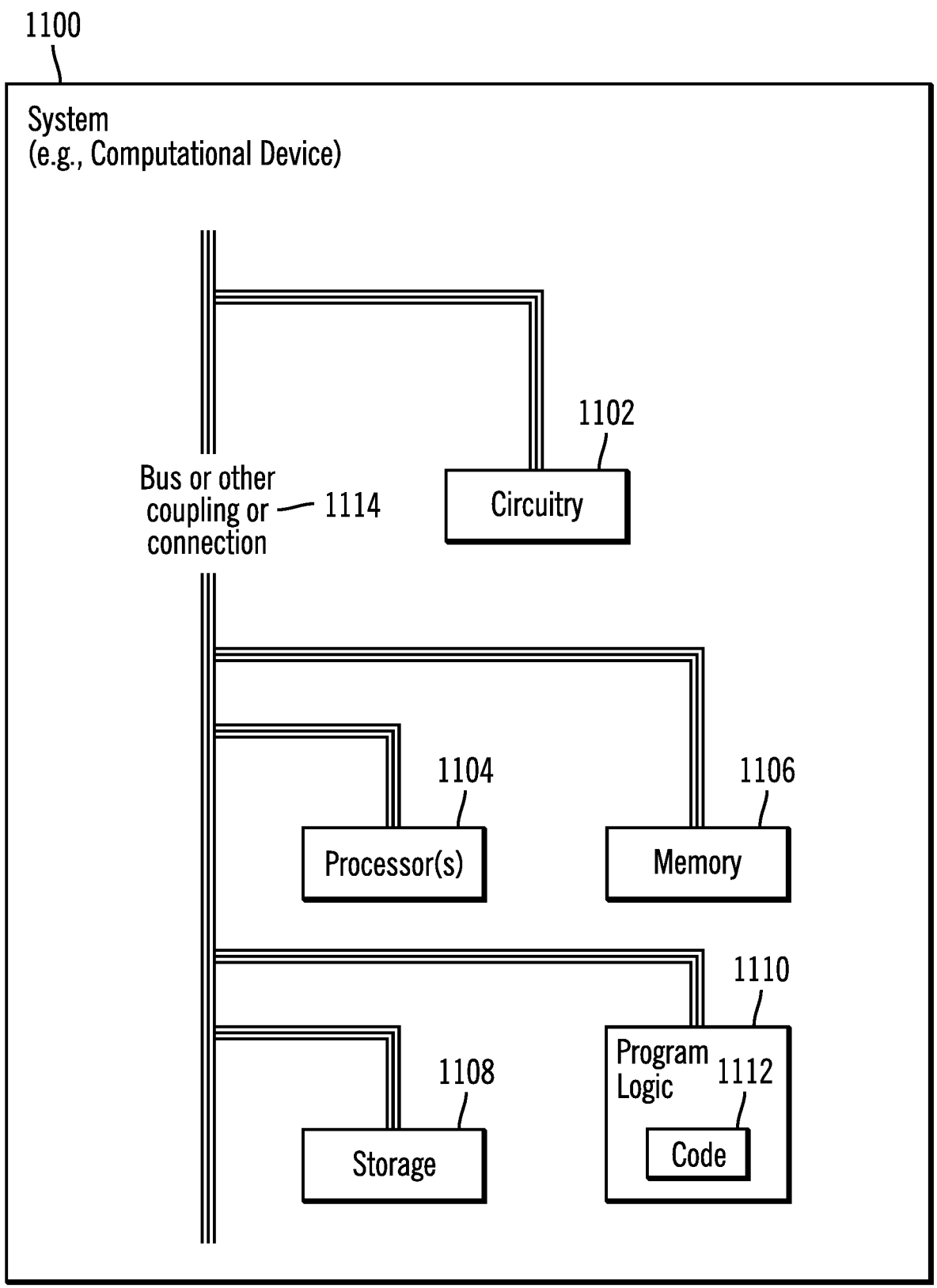
FIG. 11 illustrates a block diagram of a computational system that shows certain elements that may be included in a computational device, as described in FIG. 10, in accordance with certain embodiments.

FIG. 11 illustrates a block diagram that shows certain elements that may be included in the computational device 102 or other devices shown in FIGS. 1-11, in accordance with certain embodiments. The system 1100 may include a circuitry 1102 that may in certain embodiments include at least a processor 1104. The system 1100 may also include a memory 1106 (e.g., a volatile memory device), and storage 1108. The storage 1108 may include a non-volatile memory device (e.g., EEPROM, ROM, PROM, flash, firmware, programmable logic, etc.), magnetic disk drive, optical disk drive, tape drive, etc. The storage 1108 may comprise an internal storage device, an attached storage device and/or a network accessible storage device. The system 1100 may include a program logic 1110 including code 1112 that may be loaded into the memory 1106 and executed by the processor 1104 or circuitry 1102. In certain embodiments, the program logic 1110 including code 1112 may be stored in the storage 1108. In certain other embodiments, the program logic 1110 may be implemented in the circuitry 1102. One or more of the components in the system 1100 may communicate via a bus or via other coupling or connection 1114. Therefore, while FIG. 11 shows the program logic 1110 separately from the other elements, the program logic 1110 may be implemented in the memory 1106 and/or the circuitry 1102.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
generating a plurality of metadata corresponding to a plurality of code versions of an application stored in a version control system;
determining a set of changes between a first metadata of a first code version and a second metadata of a second code version;
classifying elements in the set of changes into a first category comprising any change in code logic and a second category comprising a change in comments, based on a set of predetermined rules, wherein occurrence of a change in method order and a mismatch in declaration of methods is classified into the first category, and wherein occurrence of a change in method order but a match in declaration of methods is classified into the second category; and
using the elements classified in the first category to determine a cause of a defect in the application.

2. The method of claim 1, wherein the metadata comprises an abstract syntax tree (AST) that represents a syntactic structure of a source code, wherein each node of the AST denotes a content or structure related construct occurring in the source code.

3. The method of claim 2, wherein calling dependency trees are generated by extracting ASTs in the plurality of code versions.

4. The method of claim 1, the method further comprising:
avoiding consideration of changes classified in the second category while determining the cause of the defect in the application.

5. The method of claim 1, wherein pruning is performed of potential candidates for analyzing defects by using only changes classified in the first category to analyze the defects.

6. A system, comprising:
a memory; and
a processor coupled to the memory, wherein the processor performs operations, the operations comprising:
generating a plurality of metadata corresponding to a plurality of code versions of an application stored in a version control system;
determining a set of changes between a first metadata of a first code version and a second metadata of a second code version;
classifying elements in the set of changes into a first category comprising any change in code logic and a second category comprising a change in comments, based on a set of predetermined rules, wherein occurrence of a change in method order and a mismatch in declaration of methods is classified into the first category, and wherein occurrence of a change in method order but a match in declaration of methods is classified into the second category; and
using the elements classified in the first category to determine a cause of a defect in the application.

7. The system of claim 6, wherein the metadata comprises an abstract syntax tree (AST) that represents a syntactic structure of a source code, wherein each node of the AST denotes a content or structure related construct occurring in the source code.

8. The system of claim 7, wherein calling dependency trees are generated by extracting ASTs in the plurality of code versions.

9. The system of claim 6, the operations further comprising:
avoiding consideration of changes classified in the second category while determining the cause of the defect in the application.

10. The system of claim 6, wherein pruning is performed of potential candidates for analyzing defects by using only changes classified in the first category to analyze the defects.

11. A computer program product comprising a computer readable storage medium having computer readable program code embodied therewith, the computer readable program code configured to perform operations, the operations comprising:
generating a plurality of metadata corresponding to a plurality of code versions of an application stored in a version control system;
determining a set of changes between a first metadata of a first code version and a second metadata of a second code version;
classifying elements in the set of changes into a first category comprising any change in code logic and a second category comprising a change in comments, based on a set of predetermined rules, wherein occurrence of a change in method order and a mismatch in declaration of methods is classified into the first category, and wherein occurrence of a change in method order but a match in declaration of methods is classified into the second category; and
using the elements classified in the first category to determine a cause of a defect in the application.

12. The computer program product of claim 11, wherein the metadata comprises an abstract syntax tree (AST) that represents a syntactic structure of a source code, wherein each node of the AST denotes a content or structure related construct occurring in the source code.

13. The computer program product of claim 12, wherein calling dependency trees are generated by extracting ASTs in the plurality of code versions.

14. The computer program product of claim 11, the operations further comprising:
avoiding consideration of changes classified in the second category while determining the cause of the defect in the application.

15. The computer program product of claim 11, wherein pruning is performed of potential candidates for analyzing defects by using only changes classified in the first category to analyze the defects.

* * * * *